_United States Patent Office_

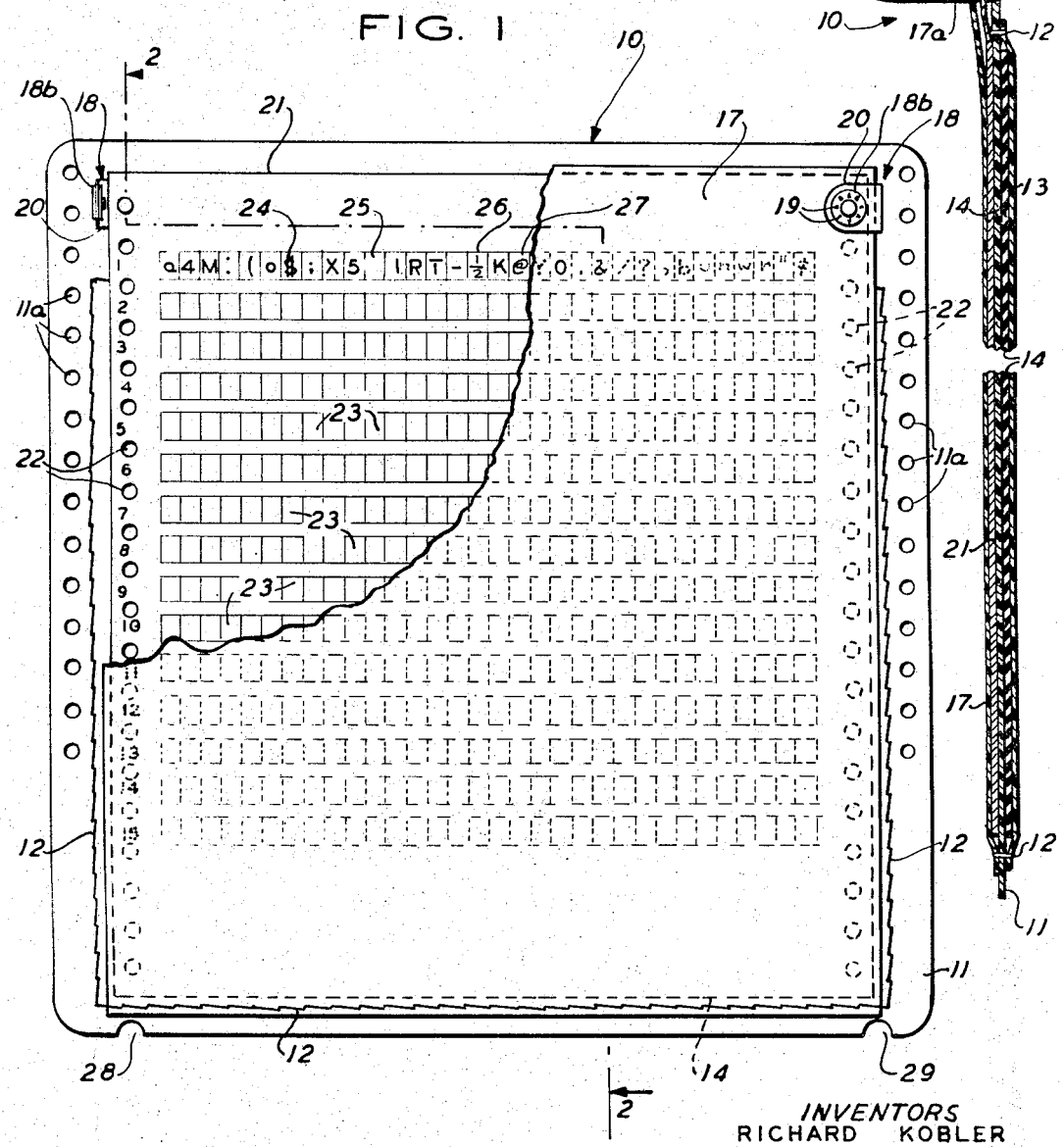

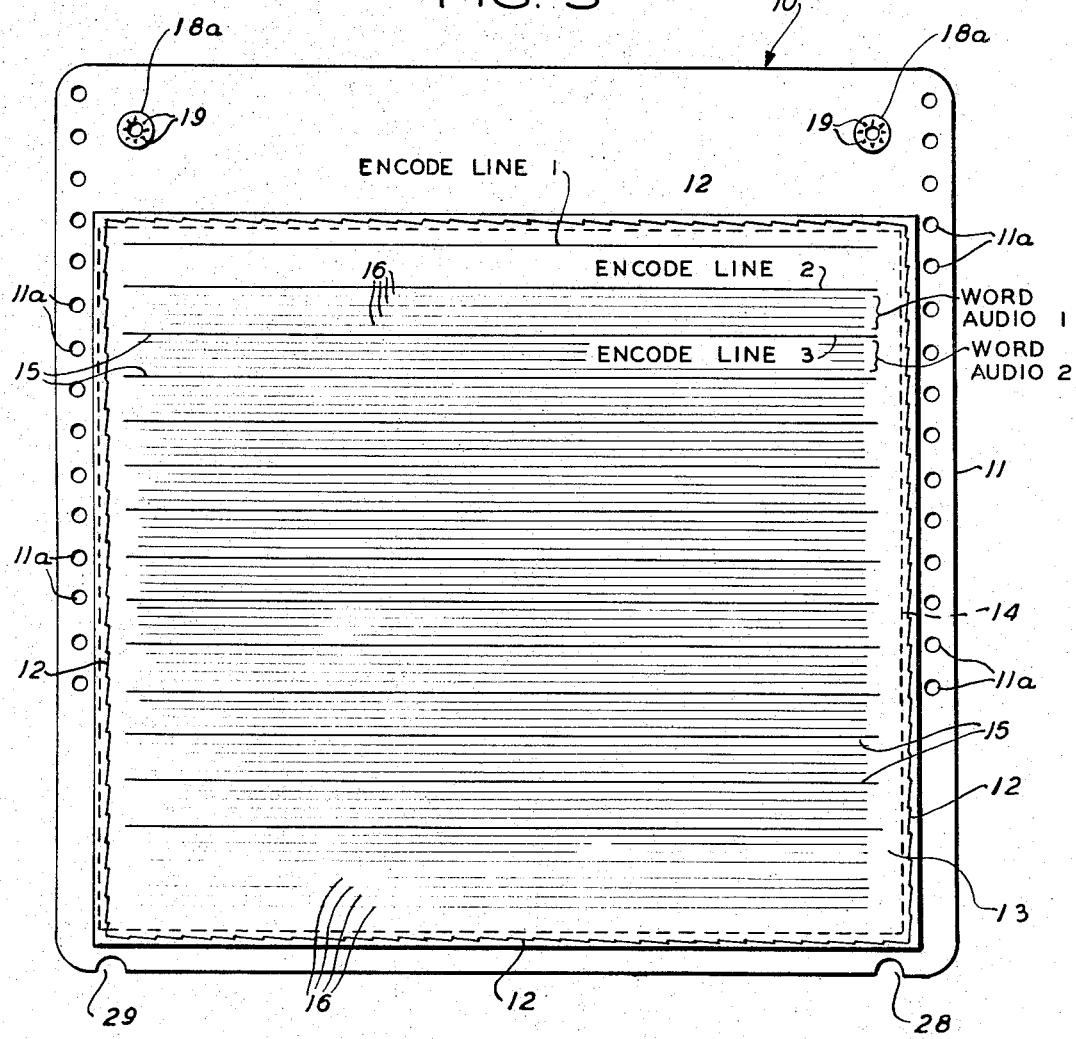

3,343,277
Patented Sept. 26, 1967

3,343,277
TEACHING MACHINE CARD
Richard Kobler, West Orange, Bruce N. Whitlock, Morris Plains, William Babaoff, Newark, and Joseph Peterpaul, West Orange, N.J., assignors to McGraw-Edison Company, Elgin, Ill., a corporation of Delaware
Filed Oct. 8, 1965, Ser. No. 494,160
9 Claims. (Cl. 35—6)

This invention relates to a novel form of exhibitor and record-medium card for visual-audio teaching machines of the character shown and described in the pending Kobler-Moore application Ser. No. 185,616, now Patent No. 3,281,959, filed Apr. 6, 1962, and entitled, Educational System and Apparatus.

The present teaching machine card is characterized as having visible printed matter in successive lines on the front side overlaid by a transparent protective sheet and as having an exposed magnetic record medium on the back side. The record medium is recorded on transverse parallel tracks in a predetermined spatial relationship to the printed matter. The recorded matter comprises an encode track and a plurality of audio tracks for each printed line.

A feature of the present teaching machine card resides in a unitary assembly of flexible superimposed sheets composed of a central semi-flexible base sheet having an attached record medium on the back side with an interposed layer of rubber to provide a backing which will yield to pressure of the magnetic head on the record medium, and having a protective transparent cover sheet on the front side detachable along one side to receive an interposed exhibitor sheet bearing printed or written items of information.

A teaching machine of the character above-referred to comprises (1) an exhibitor which receives the card of the present invention and points out to the pupil successive items of information on the front side, (2) an encoder having a pick up head driven along the respective encode track on the back side of the card in correspondence with the pointer advance, (3) an audio typewriter having a normally blocked keyboard activated selectively by the encoder to pronounce the item designated by the exhibitor and to free the respective key of the typewriter so that only that key can be depressed, and (4) a word audio machine having a pick-up head driven also across the back side of the card to make statements relating to selected words or other items designated by the exhibitor. When the pupil depresses the freed key the character designated by the exhibitor is pronounced and the exhibitor moves ahead to point out the next character. Also, as to certain items the encoder activates the word audio machine. Each encode track has at least as many coded signals—i.e., six level binary code—recorded thereon as there are characters in the respective printed line so that a code signal may be picked up and the encoder operated to activate selectively the audio typewriter and/or word audio machine during each pointer advance of the exhibitor. The record medium, being of the magnetic type, can be erased and re-recorded a great number of times. However, the exhibitor sheet bearing the typed or printed matter must be replaced each time the program presented to the pupil is changed. An object of the invention is to provide a sheet form of magnetic record medium having a permanently attached means for holding an exhibitor sheet in a fixed relation to the record medium while permitting the exhibitor sheet to be easily removed and replaced at will.

Another object is to provide a composite flexible card having a magnetic record medium and a holder for an exhibitor sheet, said holder including a transparent protective cover sheet for the exhibitor sheet which is detachable along one side to permit easy removal and replacement of the exhibitor sheet.

Another object is to provide a composite teaching card in which the flexible transparent cover sheet is secured along one border to the base sheet in the manner of a flap and is detachably secured at the opposite corner portions by snap-type fasteners.

Another object is to provide such composite teaching card in which the snap fasteners extend through corner holes in the exhibitor sheet to hold the exhibitor sheet in a substantially fixed position between the base and cover sheets.

Another object is to provide such composite card in which the rubber backing sheet between the record medium and base sheet is secured only along the border thereof away from which the encode and audio heads advance in recording on and reproducing from the record medium.

Another object is to provide a composite teaching machine card comprising a plurality of sheet media of plastic materials having the same temperature and humidity coefficients of expansion.

Another object is to provide a composite teaching machine card provided with successive lines of visual information on one side and of respective groups of encode and word audio tracks on the other side, and provided with indexing holes in opposite side borders corresponding to the respective visual lines and tracks to enable interchangeability of cards and accurate indexing in the teaching machines as to each line.

Another object is to provide such composite card composed of an assembly of plastic sheets wherein the sheets are secured permanently together by stitching.

Another object is to utilize a common stitching which secures (1) the record medium to the base sheet along all four borders, (2) the rubber backing sheet to the base sheet along only one side border which is at the start end of the encode and audio heads, and (3) the transparent protective cover sheet to the base sheet along only the bottom border thereof.

These and other objects and features of the invention will be apparent from the following description and the appended claims.

In the description of the invention, reference is had to accompanying drawings, of which:

FIGURE 1 is a front view of the present teaching machine card showing one snap fastener for the transparent cover sheet open and showing a portion of the cover sheet broken away;

FIGURE 2 is a fractional cross-sectional view to enlarged scale taken on the line 2—2 of FIGURE 1 but showing the cover sheet flexed outwardly at the top to illustrate that it is secured in the nature of a flap; and FIGURE 3 is a view of the back side of the teaching machine card wherein successive heavy dotted lines on the record medium designate encode tracks and the intermediate groups of fine dotted line represent audio tracks for the respective printed lines on the exhibitor sheet at the front side of the card.

The combined exhibitor and record medium card 10 shown in the accompanying drawings comprises a central semi-flexible base sheet 11 preferably made of Mylar (a thermo plastic polyester of terephthalate) of a thickness, for example, of approximately .014″ and typically about 11″ square. The base sheet 11 has a row of equally spaced index holes 11a along the two opposite side edges which are provided to enable the teaching card to be accurately indexed in the exhibitor with respect to each group of encode and audio tracks. Secured by stitching 12 to the back side of the base sheet 11 as by means of a conventional sewing machine is a Mylar based magnetic record sheet 13 typically about .004″ thick. Interposed between the base sheet 11 and the record sheet 13 is a latex rubber sheet 14 typically about .010″ thick. The outside dimensions of the record sheet 13 may be 11" x 11¼", and of the rubber sheet 8½" x 10¼". The record sheet is centered between the rows of indexing holes 11a but is offset downwardly from the top of the base sheet as shown in FIGURE 3. The magnetic coating on the record sheet is especially adapted to receive the encode tracks 15 and audio tracks 16 in directions transverse to the teaching machine card as shown also in FIGURE 3. The stitching 12 runs along the four borders of the record sheet about ⅛" from the edges thereof. However, the stitching 12 traverses only the left border of the rubber sheet 14 as seen from the back side of the card in FIGURE 3, the other three sides of the rubber sheet lying within the stitched area. Thus, the rubber sheet is secured only at the start end of the encode and audio heads. This is done so that the yieldable rubber sheet can elongate and avoid being buckled in response to the "ironing" effect which the encode and audio heads have as they are advanced from left to right across the record sheet. Further, stitching yields to stresses to accomodate slight dimensional changes in the superimposed layers. This is also advantageous in that it allows a slight displacement of the record sheet crosswise of the relatively thick and stiff base sheet so that any "ironing" effect of the heads on the record sheet itself will not cause the record sheet to buckle.

A transparent protective cover sheet 17 overlies the front side of the base sheet 11 from top to bottom. The cover sheet is however narrower in width than the base sheet and is centered between the rows of index holes 11a. This cover sheet is preferably made of Cronar—a special form of Mylar processed so that it has a very high transparency. The cover sheet is secured as a flap to the base sheet 11 by the stitching 12 along its bottom edge and by two snap fasteners 18 at its upper corners. Each snap fastener comprises a base section 18a with a plurality of claws 19 lanced therefrom which serve as a means for staking it to the base sheet 11. The base section 18a of each fastener has a central button 19b which extends through a clearance hole in the base sheet. The claws 19 also are utilized for staking a small plastic flap 20 to the base sheet which is oriented to extend laterally from its place of securement relative to the base sheet. The cooperating or removable section 18b of each fastener has also claws 19 lanced therefrom which are used for staking it to the flap 20. Thus, the removal section 18b of each fastener is retained to the base sheet so that it cannot be lost. In the upper corner portions of the cover sheet there are clearance holes 17a through which pass the respective buttons 19b when the cover sheet is pressed flat onto the base sheet.

The cover sheet 17 is utilized as a means for holding a paper exhibitor sheet 21 against the front side of the base sheet 11 in a predetermined spatial relationship to the magnetic record sheet and to provide also a transparent protective covering for the exhibitor sheet. The exhibitor sheet 21 has rows of index holes 22 along opposite border portions thereof the uppermost ones of which are positioned to receive the fastener buttons 19b whereby to located the exhibitor sheet on the base plate. Also, the exhibitor sheet is provided with fine lines on its front side forming square locating areas 23 for characters to be printed or written thereon. These locating lines are especially desirable when the characters are to be handwritten on the exhibitor sheet.

Any desired program or format may be written or printed on the exhibitor sheet comprising the characters such as appear on the keps of a typewriter, or comprising words, sentences, stories, etc., depending upon the age and state of advancement of the pupil. As a pupil progresses the program is changed. The present teaching machine card is especially adapted for a progressive teaching program since the exhibitor sheet is easily removed and replaced. Since the record medium on the back side is of a magnetic type, it can be re-recorded on after each replacement of the exhibitor sheet so that the encode and audio tracks will correspond to the new program. The index holes 22 in the exhibitor sheet serve as a means for locating the sheet on a typewriter platen having sprocket teeth so that the typed matter is properly located with respect to the base sheet and to the encode and audio information recorded on the record sheet.

The encode tracks are recorded with control signals in code form for the respective characters, words and sentences appearing in the respective printed lines on the front side of the card. There may be as many as two encodings for a character as when a lower case character follows an upper case character or vice versa, requiring the encoding of upper or lower case before the character itself. Also, two encodings are required for a space interval when such space interval is employed to activate the word audio machine to explain the previous character, word or sentence.

The encode tracks extend across the width of the record sheet and are spaced from each other by the distances of the printed lines from each other. Between the encode tracks are successive groups of audio tracks 16 for the respective lines on the front side of which by way of illustration there may be four such audio tracks for each printed line as shown. As before-mentioned, the teaching machine has an audio typewriter and a word audio machine. The audio typewriter includes reproducing means for pronouncing the respective characters and includes the typewriter for printing the same. The word audio machine is intended for explaining characters, words and sentences appearing on the front side of the card. Thus, for example, the word audio machine may supplement the pronunciation given by the audio typewriter to explain the dollar sign at 24, the space interval at 25, the fraction at 26 and the (at) sign at 27 on line 1 of the card. These explanations are recorded on the respective audio tracks constituting the word audio group 1 shown in FIGURE 3. A feature of the invention is in placing the word audio group 1 following the encode line 2 so that the magnetic head for scanning the audio tracks may clear sufficiently the head which scans the corresponding encode track.

The base sheet 11 is provided further with two indexing notches 28 and 29 in the bottom edge near its left and right sides. As seen in FIGURE 1, the two notches are shifted off center to the right. The exhibitor is provided with corresponding cross pins offset similarly to the right so that the card 10 will seat in a fully mounted position only when it is properly oriented with the exhibitor side of the card facing to the front of the machine and the card right side up. Unless the card is thus seated in a fully mounted position a switch or other control means will not be operated to enable the teaching machine to operate.

The embodiment of our invention herein particularly shown and described is intended to be illustrative and not necessarily limitative of our invention since the same is subject to changes and modifications without departure from the scope of our invention, which we endeavor to express according to the following claims.

We claim:

1. A composite teaching machine card for a visual-audio teaching machine comprising a semi-flexible base sheet of plastic material, a magnetically coated plastic sheet on the back side of said base sheet having lesser width and height dimensions than said base sheet to leave exposed opposite side border portions and a top portion of the base sheet, a thin flexible rubber backing sheet interposed between said magnetic sheet and said base sheet having lesser width and height dimensions than said magnetic sheet to leave unbacked top and bottom border portions and one side border portion of said magnetic sheet, a flexible transparent cover sheet on the front side of said base sheet of substantially the length of said base sheet and of a narrower width than said base sheet to leave uncovered the side border portions of the latter, and a paper exhibitor sheet bearing successive lines of printed or written information and located between said base sheet and cover sheet, said exhibitor sheet being of substantially the same width as said cover sheet, and a common stitching securing (1) said magnetic sheet along its four borders to said base sheet, (2) said rubber backing sheet to said base sheet along its side border portion opposite to said one side border portion of said magnetic sheet, and (3) said cover sheet along its lower border portion to said base sheet.

2. The composite teaching machine card set forth in claim 1 wherein said base sheet is provided with indexing holes in said side border portions corresponding respectively to said successive lines of information on said exhibitor sheet.

3. The composite teaching machine card set forth in claim 1 wherein said exhibitor sheet has a height extending from the lower stitched border portion of said cover sheet to a top border of said base sheet, said exhibitor sheet having equally spaced indexing holes in the opposite side border portions thereof to enable the sheet to be indexed accurately on a sprocketed platen as items of information are printed or typed thereon.

4. The composite teaching machine card set forth in claim 1 including a fastener at each top corner portion of said base sheet traversing the uppermost index hole in said exhibitor sheet and corresponding holes in said cover sheet to hold removably the cover sheet at its upper end to said base sheet and to hold said exhibitor sheet in a predetermined location between the cover and base sheets.

5. The composite teaching machine card set forth in claim 4 wherein the base portion of each fastener is staked to said base sheet and the outer removable portion of each fastener is staked to a flexible tab secured to said base sheet.

6. A composite teaching card for a visual-audio teaching machine which has an encoding mechanism for correlating the visual and audio information pertaining to each item of instruction, comprising overlying sheet media in the order here-named of a magnetically coated record sheet, a rubber backing sheet, a semi-flexible base sheet, a paper exhibitor sheet bearing written or printed characters in successive lines on the front side thereof, and a transparent protective cover sheet, said card further comprising a common stitching securing said magnetically coated record sheet along all four borders and said rubber backing sheet along one side border to the back side of said base sheet and securing said cover sheet along only the lower border portion thereof to the front side of said base sheet, and snap fasteners for securing the upper corner portions of said paper and cover sheets to said base sheet whereby said paper exhibitor sheet is readily removable for replacement or for printing or typing thereon when said snap fasteners are opened.

7. The composite teaching machine card set forth in claim 6 wherein said magnetically coated record sheet is adapted for transverse recording of encode and audio information in directions crosswise of said card, and wherein said rubber backing sheet is stitched along a side border portion thereof from which the encode and audio heads advance in their traversal of the record sheet whereby said rubber backing sheet tends to be placed under longitudinal tension without buckling during recording and reproducing operations.

8. The composite teaching machine card set forth in claim 6 wherein said base sheet is provided with index holes along its side border portion and said paper exhibitor sheet is secured by said fasteners in a fixed predetermined relation to said index holes, said paper exhibitor sheet bearing successive transverse lines of printed or written visual information, and said successive lines of visual information being spaced sufficiently to accommodate one encode track and a plurality of audio tracks on the back side of said magnetically coated record sheet for each line of said visual information.

9. The composite teaching machine card set forth in claim 8 wherein each of said encode tracks bear a series of magnetic impressions corresponding to the successive items of instruction in the corresponding line of printed matter on the front side of said paper exhibitor sheet, each of said magnetic impressions extending along the respective track through a distance not greater than the prescribed spacing between the respective item of instruction and a next adjacent item, each audio track bearing a magnetic impression along the track reproducible to explain or pronounce a selected item or items in a corresponding line of printed matter on the front side, and said groups of audio tracks being successively arranged so that the audio tracks corresponding to a given printed line follow the encode track for the next succeeding printed line.

References Cited
UNITED STATES PATENTS 3,128,563    4/1964    Kobler _____ 35—6
3,281,959   11/1966    Kobler et al. _____ 35—6

EUGENE R. CAPOZIO, *Primary Examiner.*

W. W. NIELSEN, *Assistant Examiner.*